US007956144B2

(12) United States Patent
Lindow et al.

(10) Patent No.: US 7,956,144 B2
(45) Date of Patent: Jun. 7, 2011

(54) ACRYLIC RESIN FOR USE IN FLUOROCARBON COATING COMPOSITIONS AND METHOD OF FORMING THE SAME

(75) Inventors: David E. Lindow, Farmington Hills, MI (US); James L. Anderson, Howell, MI (US); Donald J. Algrim, Howell, MI (US)

(73) Assignee: PPG industries Ohio, Inc., Cleveland, OH (US)

( * ) Notice: Subject to any disclaimer, the term of this patent is extended or adjusted under 35 U.S.C. 154(b) by 989 days.

(21) Appl. No.: 11/275,916

(22) Filed: Feb. 3, 2006

(65) Prior Publication Data
US 2007/0185296 A1 Aug. 9, 2007

(51) Int. Cl.
*C08F 118/02* (2006.01)
*B05D 1/36* (2006.01)
(52) U.S. Cl. ............... 526/319; 526/317.1; 428/421
(58) Field of Classification Search .......... 526/319, 526/317.1; 428/421
See application file for complete search history.

(56) References Cited

U.S. PATENT DOCUMENTS

| 3,037,006 | A | 5/1962 | Hankins et al. ............... 260/80.5 |
| 3,668,193 | A | 6/1972 | King ....................... 260/857 PA |
| 3,944,689 | A | 3/1976 | Luckock et al. ............... 427/385 |
| 4,157,996 | A | 6/1979 | Boldebuck et al. ............ 260/30.2 |
| 4,433,104 | A | 2/1984 | Giles, Jr. ....................... 525/180 |
| 4,770,939 | A | 9/1988 | Sietses et al. .................. 428/402 |
| 4,816,516 | A | 3/1989 | Yamaya et al. ................ 525/180 |
| 5,030,394 | A | 7/1991 | Sietses et al. ...................... 264/28 |
| 5,185,403 | A | 2/1993 | Lewarchik et al. ............. 525/199 |
| 5,284,893 | A | 2/1994 | Kubo et al. .................... 524/315 |
| 5,310,770 | A | 5/1994 | DeGooyer et al. |
| 5,516,837 | A | 5/1996 | Tsutsumi et al. .............. 524/600 |
| 5,700,578 | A | 12/1997 | Korney, Jr. et al. ............ 428/421 |
| 5,959,022 | A | 9/1999 | Lin et al. ........................ 524/520 |
| 6,017,639 | A | 1/2000 | Higginbotham et al. ...... 428/458 |
| 6,037,412 | A | 3/2000 | Rijkse et al. ................... 525/108 |
| 6,255,398 | B1 | 7/2001 | Zupancic et al. .............. 525/199 |
| 6,313,222 | B1 | 11/2001 | Lin et al. ........................ 525/180 |
| 6,551,708 | B2 * | 4/2003 | Tsuda et al. ................... 428/402 |
| 6,679,943 | B1 * | 1/2004 | Newton et al. ............ 106/287.14 |
| 6,699,933 | B2 | 3/2004 | Nguyen et al. ................. 525/191 |
| 7,838,582 | B2 | 11/2010 | Anderson et al. |
| 2005/0067284 | A1 * | 3/2005 | Nishiguchi et al. ........... 204/505 |
| 2009/0012235 | A1 | 1/2009 | Lindow et al. |

FOREIGN PATENT DOCUMENTS

| DE | 102005039537 A1 | 2/2007 |
| EP | 0131419 A1 | 1/1985 |
| EP | 0219928 A2 | 4/1987 |
| EP | 0225535 A2 | 6/1987 |
| WO | 9817723 A1 | 4/1998 |
| WO | 0026308 A1 | 5/2000 |
| WO | 07092663 A2 | 8/2007 |

* cited by examiner

*Primary Examiner* — Michael M Bernshteyn
(74) *Attorney, Agent, or Firm* — Donald R Palladino

(57) ABSTRACT

An acrylic resin and method of forming the acrylic resin for use in fluorocarbon coating compositions are disclosed. The fluorocarbon coating composition generally comprises a fluorocarbon resin, a cross-linking agent, and the acrylic resin. The acrylic resin comprises the reaction product of (1) at least one non-functional acrylic monomer, (2) at least one epoxy functional acrylic monomer having an epoxy group, and (3) at least one functional acrylic monomer different than (2). At least one amino compound having a cyclic, heterocyclic, alkyl, or heteroalkyl structure substituted with a primary or secondary amine group is reacted with the epoxy functional acrylic monomer (2) such that the primary or secondary amine opens the epoxy group to obtain the acrylic resin having amine functionality and hydroxyl functionality.

22 Claims, No Drawings

ACRYLIC RESIN FOR USE IN FLUOROCARBON COATING COMPOSITIONS AND METHOD OF FORMING THE SAME

BACKGROUND OF THE INVENTION

1. Field of the Invention

The subject invention generally relates to an acrylic resin and method of forming the acrylic resin. More specifically, the acrylic resin of the subject invention is useful in fluorocarbon coating compositions.

2. Description of the Related Art

Fluorocarbon resins, such as polyvinylidene fluoride (PVDF), are useful in formulating coatings with excellent weathering resistance. It is common to add binder resins to fluorocarbon coating compositions because fluorocarbon resins have poor rheology and pigment wetting characteristics. Typical binder resins that have been previously utilized with fluorocarbon coating compositions include acrylic resins Such acrylic resins are preferred for many applications because of the improved mechanical and chemical resistance that are provided as a result of incorporating the acrylic resin therein.

To achieve optimal weathering and chemical resistance, high fluorocarbon resin content is desired in the coating compositions. Many coating applications call for coating compositions having 70 weight percent or more fluorocarbon resins and the remainder is the binder resin. Coating compositions containing fluorocarbon resins, particularly PVDF, and acrylic resins as the binder resins tend to have relatively high viscosities. For some coating applications, particularly coil coating applications, it would be desirable to have high fluorocarbon resin content in conjunction with the acrylic resin, but with lower viscosity than is currently possible with the related art compositions.

In order to provide desired pigment wetting characteristics, some related art methods have manipulated the acrylic resin during formation. For example, the acrylic resins have been polymerized from acrylic acids and acrylic esters having no additional functionality, acrylic acids, and acrylic esters having additional functionality, and an acryloxyalkyl oxazolidine. The functional acrylic acid/esters provide sites for cross-linking with cross-linking agents. The acryloxyalkyl oxazolidine reduces the viscosity of the fluorocarbon resin and acrylic resin. One specific acryloxyalkyl oxazolidine that has been previously utilized is 3-(2-methacryloxyethyl)-2,2-spirocyclohexyl oxazolidine (MESO). The MESO monomers are becoming increasingly difficult and/or more expensive to obtain due to the high cost of manufacturing Other attempts to lower viscosity of the acrylic resin have included polymerizing and/or reacting the acrylic resin with polyimides, amino groups, epoxy groups, and the like. However, these modified acrylic resins do not perform as well as acrylic resins modified with MESO.

Accordingly, it would advantageous to provide an acrylic resin that adequately lowers viscosity and that provides desired pigment wetting characteristics when incorporated into a coating composition. Further, it would be advantageous to provide a method of forming the acrylic resin from monomers and starting components that are commercially available and that are relatively inexpensive such that manufacturing coating compositions that include the acrylic resin is not cost prohibitive.

SUMMARY Of THE INVENTION AND ADVANTAGES

The subject invention provides a method of forming an acrylic resin. The method comprises polymerizing (1) at least one non-functional acrylic monomer and (2) at least one epoxy functional acrylic monomer having an epoxy group. At least one amino compound having a cyclic, heterocyclic, alkyl, or heteroalkyl structure substituted with a primary or secondary amine group is reacted with the epoxy functional acrylic monomer such that the primary or secondary amine opens the epoxy group to obtain the acrylic resin having amine functionality and hydroxyl functionality.

The acrylic resin formed therefrom is particularly suited for use in fluorocarbon coating compositions. The fluorocarbon coating composition comprises a fluorocarbon resin, a cross-linking agent, and the acrylic resin. The acrylic resin has amine functionality from the amino compound to aid in dispersion of fluorocarbon resins and hydroxyl functionality from opening the epoxy group to enhance cross-linking with cross-linking agents. Said another way, the amine functionality from the amino compound lowers the viscosity of the coating composition such that the subject invention may replace acrylic resins that utilize acryloxyalkyl oxazolidine The subject invention overcomes the inadequacies that characterize the related art acrylic resins and fluorocarbon coating compositions. Specifically, the subject invention prepares the acrylic resin from commercially available and relatively inexpensive monomers such that manufacturing cost may be reduced by incorporating the acrylic resin into coating compositions Further, the viscosity of the coating composition is sufficiently lowered as a result of incorporating the acrylic resin formed according to the subject invention. Another advantage is that the opening of the epoxy group may result in increased cross-linking with the cross-linking agents.

DETAILED DESCRIPTION OF THE INVENTION

An acrylic resin and method of forming the acrylic resin are disclosed. More specifically, the acrylic resin is particularly suited for use in fluorocarbon coating compositions. The fluorocarbon coating composition generally comprises a fluorocarbon resin, a cross-linking agent, the acrylic resin, solvent and additives.

Suitable fluorocarbon resins for use in the subject invention include polyvinylidine fluoride (PVDF), such as those sold under the trademark Kynar; polyvinyl fluoride, polytetrafluoroethylene; copolymers of vinylidene fluoride and tetrafluoroethylene, such as that sold under the trademark Kynar SL; a fluoroethylene/vinyl ester/vinyl ether sold under the trademark Fluonate; proprietary vinylidene fluoride-based polymers sold under the trademarks Kynar 500 and Kynar SL; and mixtures of the fluorocarbon resins. The fluorocarbon resins have a high molecular weight, typically having a molecular weight (weight average) in the range of about 100,000 to about 500,000. The fluorocarbon resins are preferably utilized in powder form. The powders are insoluble in solvents used in the coating compositions of the present invention, but are swelled by the solvents, which increases the viscosity of the coating composition.

The fluorocarbon resin is present in an amount of from about 30 to about 99 percent based on the total weight of the coating composition, typically from about 45 to about 85 percent, and preferably from about 55 to about 75 percent. In order to achieve optimal chemical and mechanical resistance, it is desirable for the fluorocarbon resin to be present in an amount of about 70 percent. When the amount of the fluorocarbon resin is above 70 percent only minor improvements in chemical and mechanical resistance may be achieved, but the costs significantly increase due to the high cost of the fluorocarbon resins.

The cross-linking agent may be an aminoplast resin, such as a melamine/formaldehyde resin or a melamine urea resin. Other suitable cross-linking agents include isocyanates, blocked isocyanates, carbamates, organo-silanes, and glycol ureas. The cross-linking agent is generally selected to be substantially non-reactive with the acrylic resin at ambient temperatures, but to cross-link with the same at an elevated curing temperature, e.g., the curing temperature for a substrate to which the coating composition is applied. The cross-linking agent is typically employed in an amount of from about 0.2 to about 20 percent based on the total weight of the coating composition. Typically a catalyst is used during the coating bake to promote curing. Such catalysts are well-known in the art and include, without limitation, p-toluene sulfonic acid, methane sulfonic acid, nonylbenzene sulfonic acid, dinonyl-naphthalene disulfonic acid, dinonylnaphthalene sulfonic acid, dodecylbenzene-sulfonic acid, phenyl acid phosphate, monobutyl maleate, butyl phosphate, monoalkyl and dialkyl acid phosphates, and hydroxy phosphate ester. Strong acid catalysts may be blocked, e.g. with an amine. Other catalysts that may be useful in the composition of the invention include Lewis acids, zinc salts, and tin salts. Catalysts are generally included in amounts of from about 0.1 to about 5.0 weight percent, based on the binder weight.

The acrylic resin comprises the reaction product of multiple acrylic or acrylic monomers. The acrylic resin is generally present in an amount of from about 10 to about 60 percent based on the total weight of the coating composition. A first type of acrylic monomer is (1) at least one non-functional acrylic monomer The non-functional acrylic monomer may also include alkacrylic monomers, alkyl acrylic monomer, and/or alkyl alkacrylic monomers. The non-functional acrylic monomer has the general formula:

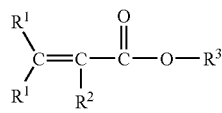

wherein $R^1$ and $R^2$ are the same or different and are each selected from —H and $C_1$ to $C_3$ alkyl and $R^3$ is $C_1$ to $C_6$ alkyl. Examples of this type of non-functional acrylic monomer (1) include methyl methacrylate, methyl acrylate, ethyl acrylate, ethyl methacrylate, butyl acrylate, butyl methacrylate, and tert-butyl methacrylate.

The first type of acrylic monomer (1) is present in an amount of from about 80 to about 95 percent based on the total weight of the acrylic resin. Without intending to be bound by theory, it is believed that the first type of acrylic monomer (1) provides the cured coating composition with weather resistance and toughness.

A second type of acrylic monomer is (2) at least one epoxy functional acrylic monomer having an epoxy group. The epoxy functional acrylic monomer may also include alkacrylic monomers, alkyl acrylic monomer, and/or alkyl alkacrylic monomers. This type (2) of acrylic monomer may be selected from at least one of glycidyl methacrylate and glycidyl acrylate. It is to be appreciated that glycidyl ethers may also be used as the epoxy functional acrylic monomer. Suitable glycidyl ethers include, but are not limited to, glycidyl vinyl ether and glycidyl vinylbenzyl ether. The second type of acrylic monomer (2) is present in an amount of from about 0.5 to about 15 percent based on the total weight of the acrylic resin.

A third type of acrylic monomer that may be used in the subject invention to form the acrylic resin is (3) at least one functional acrylic monomer, which makes it cross-linkable with the cross-linking agent. The functional acrylic monomer may also include alkacrylic monomers, alkyl acrylic monomer, and/or alkyl alkacrylic monomers. It is to be appreciated that this type (3) of acrylic monomer has the general formula:

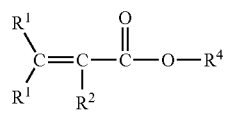

wherein $R^1$ and $R^2$ are the same or different and are each selected from H and $C_1$ to $C_3$ alkyl and $R^4$ is the residue of an alcohol having additional OH or beta-diketone functionality. Examples of this type of acrylic monomer (3) include hydroxy ethyl methacrylate, hydroxy ethyl acrylate, hydroxy propyl methaclylate, hydroxypropyl acrylate, and acetoacetoxyethyl methacrylate.

The third type of acrylic monomer (3) is present in an amount of from about 0.1 to about 30 percent based on the total weight of the acrylic resin. Without intending to be bound by theory, it is believed that the third type of acrylic monomer (3) enables the acrylic resin to be cross-linked with the cross-linking agent when used in the coating composition.

The acrylic resin also includes at least one amino compound substituted with a primary or secondary amine group. The amino compound may have a heterocyclic, cyclic, alkyl, or heteroalkyl structure The amino compound is reacted with the epoxy functional acrylic monomer (2) such that the primary or secondary amine group opens the epoxy group to obtain the acrylic resin having amine functionality and hydroxyl functionality. It is to be appreciated that the acrylic resin may be formed without (3) since the reaction of (2) with the amino compound results in a hydroxy group that may serve as a site for cross-linking.

The heterocyclic compound has at least one nitrogen in place of carbon and may further include at least one oxygen in place of carbon. When the amino compound has the heterocyclic structure, the amino compound has a general ring structure. Suitable heterocyclic amino compounds may be selected from, but not limited to, at least one of ethyleneurea, pyrrolidine, 2-pyrrolidone, piperidine, all oxazolidines and morpholine. When the amino compound has the cyclic structure, the amino compound has a cyclic hydrocarbon with at least one primary or secondary amines. One suitable cyclic amino compound includes dicyclohexyl amine. When the amino compound has an alkyl structure, the alkyl structure includes a hydrocarbon chain that may be branched or linear with at least one primary or secondary amine. Suited alkyl amino compounds include t-butyl amine, isopropylamine, diisoproylamine, 2-amino-2-methyl-1-propanol, and ethanol amine. The heteloalkyl structure includes the hydrocarbon chain and may have at least one primary or secondary amine and/or oxygen as part of the hydrocarbon chain. Suitable heteroalkyl amino compounds include N,N-dimethyl-1,3-propanediamine, dimethyl amine, and diethanol amine.

Other suitable amino compounds that may be reacted with the epoxy ring ale hydroxy (or thiol) functional compounds that contain tertiary amines. These compounds would have the general structure:

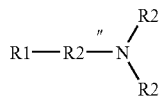

Where:
R1=—OH or —SH
R2=Alkyl, Alkenyl, Aryl, Alkaryl, or Aralkyl

In these cases hydroxyl (or thiol) opens the epoxy ring. The hydroxy (or thiol) functional tert-amino compound may be heterocyclic, heteroalkyl, or hetroalkenyl. Examples of heterocyclic compounds include, but are not limited to: hydroxypyridine, 4-hydroxyquinazoline, 3-hydroxy-1-methylpiperidine. Examples of heteroalkyl compounds include, but are not limited to: N,N-dimethyl ethanolamine, N,N-diethyl ethanolamine, & N,N-diethyl hydroxylamine. The reaction of a hydroxy functional tert-amine with an epoxy ring is typically autocatalytic. If reaction difficulties were encountered then, a catalyst known to promote this type of reaction would most likely be used.

The amino compound is used in an amount of from about 0.1 to about 15 percent based on the total weight of the acrylic resin. The reaction product of the amino compound and the second type (2) of acrylic monomer reduces the viscosity of the coating composition. Further, the reaction product helps to render the acrylic resin more compatible with the fluorocarbon resin and thereby stabilizes the viscosity of the coating composition.

The amino compound may be reacted with (2) after (1) and (2) have been polymerized or prior to polymerizing (1) and (2) When the acrylic resin is formed from (1) and (2), it has been discovered that the formation of the acrylic resin is very temperature sensitive. In order to ensure that the amino compound opens the epoxy group of (2), the temperature should be maintained with in a temperature range of from about 60 to about 140° C. By doing so, the likelihood of the amine group or the epoxy group reacting with other reactive groups present is reduced or eliminated.

If the acrylic resin includes (3), then the amino compound may be reacted with (2) after (1), (2), and (3) have been polymerized or prior to polymerizing (1), (2), and (3). When the acrylic resin is formed from (1), (2), and (3), the temperature can be within a temperature range of about 30-170° C., more preferably 60-130° C. and most preferably 70-110° C., Ring opening below temperature of 50° C. would most likely require a catalyst known to promote this type of reaction. The temperature must be controlled to reduce or eliminate the reaction between the reactive groups, such as hydroxyl groups of (3), and the epoxy group of (2). Further, the temperature needs to be controlled to prevent the amine group of the amino compound from acting as a catalyst for the undesired reaction of the reactive groups and the epoxy group. However, it is to be understood by those of ordinary skill in the art that after the epoxy group reacts with the amine group, the temperature may be increased without incurring detrimental effects, such as undesirable side reactions.

Formation of the acrylic resin may require the use of an initiator. Various known initiators may be used with the subject invention. Typically initiators would be chosen from azo or organic peroxide types An illustrative example of an azo based initiator would be Vazo® 67, commercially available from DuPont or Akzo Almost any peroxide based initiators may be considered for use. Examples of typical peroxides would be tert-butyl peroxy acetate, tert-butyl peroxy-2-ethyl hexanoate, t-butyl amyl peroxide, and the like.

The molecular weight (weight average) of the resin can range from 5,000 to about 120,000. Typically, resins have a molecular weigh in the range of about 10,000 to 60,000 and mote typically from 15,000 to 45,000.

The coating compositions of the present invention may be based in an organic solvent or mixture of solvents. Suitable solvents include, but are not limited to, glycols, esters, ether-esters, glycol-esters, ether-alcohols, aliphatic hydrocarbons, aromatic hydrocarbons, and phthalate plasticizers, either in combination or individually as primary solvents. Solids levels ate generally between about 30 and about 70 percent. Solid levels between about 45 and about 65 percent are most typical. Examples of suitable solvents include aromatic 100, butyl carbitol acetate, dibasic ester, methyl amyl ketone, and isophorone.

The coating composition may be cleat when used, for example, as a clear coat over a color coat. It may also contain pigments and fillers up to about 30 percent based on the total weight of the coating composition. Types of pigments that might be used in this coating system encompass all pigments used in the coating industry depending on color, physical needs, durability, and chemical resistance. Suitable pigments include inorganic metal oxides, organic compounds, metal flake, and mica pigments, extender or fillet pigments, and corrosion-inhibitive pigments, such as chromates, silicas, silicates, phosphates, and molybdates. Both underlying color coat and overlaying clear coat may be formulated in accordance with the subject invention The coating composition may be applied to a bare metal surface, but is preferably applied to metal, which has been first coated with a primer coat or treated by other known methods including electrocoating. Suitable primers include acrylics, polyesters, and epoxies crosslinked with melamines, blocked isocyanates and phenolics.

Coating compositions in accordance with the present invention may be applied to substrates by a variety of processes. However, the coating compositions are particularly formulated for and useful in coil coating and or spray processes. In reverse toll coil coating, the coating compositions are typically applied at peak metal temperatures (PMT) of between about 400 to 500° F. Dwell time at PMT ranges from about 10 seconds to about 5 minutes. If the coating compositions are applied by spray, cure temperatures are similar; but substantially longer cure times are required due to larger metal mass, e.g., about 20 minutes. Coatings applied using the Spray Process can have a film build range of 0.6-2.5 mils Typically, for most processes, film builds for spray are in the range of 1.2-1.4 mils. Coatings applied using the Coil Process can have a film build range of 0.2-1.2 mils; preferably most coil lines will run in the 0.7-0.9 mils range.

The following examples, illustrating the formation of the acrylic resin and coating composition and illustrating certain properties of the acrylic resin and coating composition, as presented herein, ate intended to illustrate and not limit the invention.

EXAMPLES

An acrylic resin was formed according to the compositions listed in the table below. The amounts in Table 1 are in grams unless otherwise specified.

TABLE 1

Acrylic Resin Formulations

| | Ex. 1 | Ex. 2 | Ex. 3 | Comp. Ex. 1 |
|---|---|---|---|---|
| Initiator | 36.5 | 36.5 | 34.2 | 18.8 |
| Non-Functional Acrylic Monomer (1) | 984.4 | 975.1 | 1010.6 | 606.3 |
| Epoxy Functional Acrylic Monomer (2) | 15.6 | 12.5 | 16.0 | 0.0 |
| Functional Acrylic Monomer (3) | 41.7 | 41.7 | 42.8 | 70.0 |
| Amino compound | 9.5 | 7.6 | 8.26 | 0.0 |
| 15% 3-(2-methacryloxyethyl)-2,2-spirocyclohexyl oxazolidine (MESO)/ 85% methyl methacrylate solution | 0.0 | 12.5 | 0.0 | 304.9 |
| Solvent | 1,214.2 | 1,214.2 | 1188.0 | 1,500.6 |
| Total | 2,301.9 | 2,300.1 | 2,297.56 | 2,500.6 |

In Example 1, the non-functional monomer (1) is methyl methacrylate, the epoxy functional acrylic monomer (2) is glycidyl methacrylate, the functional acrylic monomer (3) is 2-hydroxyethylmethacrylate, and the amino compound is morpholine The initiator is Vazo® 67, commercially available from DuPont. A mixture of Aromatic 100 (549.3 grams) and methyl n-amyl ketone (MAK) (364.9 grams) was charged to a three-liter resin reaction flask equipped with an agitator, condenser, thermometer, inert gas inlet, and addition funnel. The reactor was flushed with nitrogen and the charge was heated to 105° C. A premix of (1), (2), (3), and 17.3 grams of Aromatic 100 was made and placed in the addition funnel and was added to the reactor over a four hour period maintaining the temperature at 105° C. In addition to the premix, 26.0 grams of Vazo® 67 and 128.8 grams of MAK were also added over the four-hour period.

After the addition was complete, the reactor contents were flushed with 26.5 grams of MAK and the contents were held at 105° C. for thirty minutes. Next, 10.5 grams of Vazo® 67 and 57.2 grams of MAK where added in one-third increments over 60 minutes and held at 105° C. for thirty minutes. The reactor was again flushed with 19 grams of MAK and the conversion of monomer to polymer was completed The resin was cooled to 80° C. and the morpholine was added and flushed with 19 grams of MAK and 32.2 grams of Aromatic 100. By reducing the temperature to 80° C., the reaction of the amine group of the amino compound with the epoxy group of (2) was controlled and the undesired reactions were reduced or eliminated. The resin was then held for 30 minutes and cooled.

The resulting resin had a solids content of 49.7%, an amine value of 7.1 (mg KOH/gram resin solids), viscosity of Y-Z (Gardner-Holdt bubble) at 25° C., and weight per gallon of 8.16 LB.

In Example 2, 96% of the MESO (as compared to Comparative Example 1), has been removed and replaced by the reaction of (2) with the amino compound It is to be appreciated that one objective of the subject invention is to reduce or eliminate use reliance on MESO, however, it may still be used in smaller quantities Other cyclo oxazolidines may be substituted for MESO in order to reduce cost. The non-functional monomer (1) is methyl methacrylate, the epoxy functional acrylic monomer (2) is glycidyl methacrylate, the functional acrylic monomer (3) is 2-hydroxyethylmethacrylate, and the amino compound is morpholine. The initiator is Vazo® 67, commercially available from DuPont. A mixture of Aromatic 100 (549.3 grams) and methyl n-amyl ketone (MAK) (364.9 grams) was charged to a three liter resin reaction flask equipped with an agitator, condenser, thermometer; inert gas inlet, and addition funnel. The reactor was flushed with nitrogen and the charge was heated to 105° C. A premix of (1), (2), (3), MESO, and 17.3 grams of Aromatic 100 was made and placed in the addition funnel and was added to the reactor over a four hour period maintaining the temperature at 105° C. In addition to the premix, 26.0 grams of Vazo® 67 and 128.8 grams of MAK were also added over the four-hour period.

After the addition was complete, the reactor contents were flushed with 26.5 grams of MAK and the contents were held at 105° C. for thirty minutes. Next, 10.5 grams of Vazo® 67 and 57.2 grams of MAK where added in one-third increments over 60 minutes and held at 105° C. for thirty minutes. The reactor was again flushed with 19 grams of MAK and the conversion of monomer to polymer was completed. The resin was cooled to 80° C. and the morpholine was added and flushed with 19 grams of MAK and 32.2 grams of Aromatic 100. By reducing the temperature to 80° C., the reaction of the amine group of the amino compound with the epoxy group of (2) was controlled and the undesired reactions were reduced or eliminated. The resin was then held for 30 minutes and cooled.

The resulting resin had a solids content of 50%, an amine value of 7.0 (mg KOH/gram resin solids), viscosity of W-Z (Gardner-Holdt bubble) at 25° C., and weight per gallon of 8.16 lbs.

In Example 3, the non-functional monomer (1) is 1008.5 grams of methyl methacrylate and 2.1 grams of butyl methacrylate, the epoxy functional acrylic monomer (2) is glycidyl methacrylate, the functional acrylic monomer (3) is 2-hydroxyethylmethacrylate, and the amino compound is t-butyl amine. The initiator is Vazo® 67, commercially available from DuPont. A mixture of Aromatic 100 (523.1 grams) and methyl n-amyl ketone (MAK) (364.9 grams) was charged to a three-liter resin reaction flask equipped with an agitator, condenser, thermometer, inert gas inlet, and addition funnel. The reactor was flushed with nitrogen and the charge was heated to about 110° C. A premix of (1), (2), (3), and 17.3 grams of Aromatic 100 was made and placed in the addition funnel and was added to the reactor over a foul hour period maintaining the temperature at 110° C. In addition to the premix, 23.5 grams of Vazo® 67 and 128.8 grams of MAK were also added over the four-hour period.

After the addition was complete, the reactor contents were flushed with 26.5 grams of MAK and the contents were held at 110° C. for thirty minutes. Next, 10.7 grams of Vazo® 67 and 57.2 grams of MAK where added in one-third increments over 60 minutes and held at 110° C. for thirty minutes. The reactor was again flushed with 19 grams of MAK and the conversion of monomer to polymer was completed. The resin was cooled to 80° C. and the t-butyl amine was added and flushed with 19 grams of MAK and 32.2 grams of Aromatic 100. By reducing the temperature to 80° C., the reaction of the amine group of the amino compound with the epoxy group of (2) was controlled and the undesired reactions were reduced or eliminated. The resin was then held for 30 minutes and the temperature was increased to 120° C. and held for 15 minutes. The resin was then cooled and filtered.

The resulting resin had a solids content of 50.0%, an amine value of 7 0 (mg KOH/gram resin solids), viscosity of W-Z (Gardner-Holdt bubble) at 25° C., and weight pet gallon of 8.16 LB.

In Comparative Example 1, the non-functional monomer (1) is methyl methacrylate, the functional acrylic monomer (3) is acetoacetoxyethyl methacrylate, and the initiator is Vazo® 67, commercially available from DuPont. A mixture of isophorone (150.0 grams), xylene (641.5 grams), and propylene carbonate (600.6 grams) was charged to a three liter resin reaction flask equipped with an agitator, condenser, thermometer, inert gas inlet, and addition funnel. The reactor was flushed with nitrogen and the charge was heated to 103° C. A premix of the methyl methacrylate, 3-(2-methacryloxyethyl)-2,2-spirocyclohexyl oxazolidine, acetoacetoxyethyl methacrylate, and 6.8 grams of Vazo 67 was made and placed in the addition funnel and was added to the reactor over a three hour period maintaining the temperature at 103° C.

After the addition was complete, the reactor contents were held at 107° C. for thirty minutes. The reaction mixture was then cooled to 99° C., and the conversion of monomer to polymer was completed by making six additions, one every thirty minutes, each consisting of 2.0 grams of Vazo 67 and 3.5 grams of xylene. After a final post-cook of thirty minutes, the resin was cooled and packaged.

The resulting resin had a solids content of 2.6%, an amine value of 11.6 (mg KOH/gram resin solids), viscosity of Z1 (Gardner-Holdt bubble) at 25° C., and weight per gallon of 8.85 lbs.

Each of the three acrylic resins may then be incorporated into a fluorocarbon coating composition. The components are listed in grams unless otherwise indicated.

TABLE 2

Coating Composition Formulations

|  | Ex. 1 | Ex. 2 | Comp. Ex. 1 |
| --- | --- | --- | --- |
| Fluorocarbon resin | 22.1 | 29.4 | 31.2 |
| Cross-linking Agent | 0.5 | 0.7 | 0.7 |
| Acrylic Resin | 9.2 | 12.4 | 13.2 |
| Pigment | 15.8 | 23.3 | 16.5 |
| Solvent | 51.8 | 33.4 | 37.6 |
| Acid Catalyst | 0.1 | 0.1 | 0.1 |
| Defoamer | 0.3 | 0.3 | 0.3 |
| Wax Solution | 0.2 | 0.2 | 0.2 |
| Antioxidant | 0.2 | 0.2 | 0.2 |

In Example 1, a pigment dispersion is formed by dispersing 15.8 g of titanium oxide pigment dispersed in a mixture of 5 g acrylic resin and 20 g of solvent (isophorone). The acrylic resin is reduced with the solvent and powdered titanium dioxide pigment is added under agitation. The pigment is completely dispersed using a high-speed blade. The resin, solvent and pigment mixture is then passed through a media mill to achieve complete dispersion. A fluorocarbon base is prepared by dispersing 22.1 g of the fluorocarbon resin (polyvinylidene difluoride (PVDF)) in 4.2 g of the acrylic resin and 20 g of solvent. Again, the acrylic resin is reduced with solvent and the powdered PVDF is added under agitation and the PVDF is completely dispersed using a high-speed blade.

An intermediate base is prepared by adding the remaining components into the fluorocarbon base For example, 0.1 g of acid catalyst and 0.5 g of melamine (crosslinking agent) are added to the fluorocarbon base Likewise, 0.3 g of defoamer, 0.2 g of wax solution and 0.2 g of antioxidant were added to the fluorocarbon base.

The coating composition is completed by blending the pigment dispersion and the fluorocarbon base and adjusting the viscosity with the remaining 11.8 g of solvent. Various tests, such as viscosity and density, ate run on the final formulation to ensure its compositional integrity. The coating composition is cured by applying a film to a substrate and baking at 200-260° C. for 6-10 minutes.

In Example 2, a pigment dispersion is formed by dispersing 23.3 g of titanium oxide pigment dispersed in a mixture of 6 g acrylic resin and 14 g of solvent. The acrylic resin is reduced with the solvent and powdered titanium dioxide pigment is added under agitation. The pigment is completely dispersed using a high-speed blade. The resin, solvent and pigment mixture is then passed through a media mill to achieve complete dispersion. A fluorocarbon base is prepared by dispersing 29.4 g of the fluorocarbon resin (polyvinylidene difluoride (PVDF)) in 6.4 g of the acrylic resin and 14 g of solvent. Again, the acrylic resin is reduced with solvent and the powdered PVDF is added under agitation and the PVDF is completely dispersed using a high-speed blade.

An intermediate base is prepared by adding the remaining components into the fluorocarbon base. For example, 0.1 g of acid catalyst and 0.7 g of melamine (crosslinking agent) are added to the fluorocarbon base. Likewise, 0.3 g of defoamer, 0.2 g of wax solution and 0.2 g of antioxidant were added to the fluorocarbon base.

The coating composition is completed by blending the pigment dispersion and the fluorocarbon base and adjusting the viscosity with the remaining 5.4 g of solvent. Various tests, such as viscosity and density, are run on the final formulation to ensure its compositional integrity. The coating composition is cured by applying a film to a substrate and baking at 200-260° C. for 6-10 minutes.

In Comparative Example 1, the pigment dispersion is formed from the acrylic resin, the pigment, and the solvent. Next, the fluorocarbon base is formed from the fluorocarbon resin, 1.4 g of the acrylic resin, and 7.2 g of the solvent. The remaining components are added to the fluorocarbon base. The cross-linking agent is hexamethoxymethyl melamine The coating composition is completed by blending the pigment dispersion and the fluorocarbon base and adjusting the viscosity with the remaining solvent. Various tests, such as viscosity and density, ate tun on the final formulation to ensure its compositional integrity. The coating composition is cured by applying a film to a substrate and baking at 200-260° C. for 6-10 minutes The coating compositions of Examples 1 and 2 and Comparative Example 1 were applied to steel panels and baked 55 seconds at 305° C. to yield 0.75-0.85 mil (0.019-0.022 mm) films Methylethyl Ketone (MEK) resistance of the film was then measured as the number of double rubs to film failure. Example 1 performed well for 200+ rubs, Example 2 performed well for 200+ rubs, and Comparative Example 1 performed well for 100+ rubs. These results indicate that Examples 1 and 2 performs at least as well as, if not better than, the coating composition that relied upon MESO. As discussed above, MESO is becoming increasingly difficult and expensive to obtain. Therefore, it was an object of the subject invention to provide an alternate coating composition that performs as well and that is less expensive to manufacture.

Obviously, many modifications and variations of the present invention are possible in light of the above teachings. The invention may be practiced otherwise than as specifically described within the scope of the appended claims.

What is claimed is:

1. A liquid fluorocarbon coating composition comprising:
a fluorocarbon resin;
a cross-linking agent; and
an acrylic resin solubilized in a solvent comprising a reaction product of at least one amino compound having a cyclic, heterocyclic, alkyl, or heteroalkyl structure substituted with a primary or secondary amine group and the reaction product of (1) at least one non-functional acrylic monomer and (2) at least one epoxy functional acrylic monomer having an epoxy group; and wherein said acrylic resin has amine functionality and hydroxyl functionality.

2. A liquid fluorocarbon coating composition as set forth in claim 1 wherein said acrylic resin further comprises the reaction product of (3) at least one functional acrylic monomer different than (2).

3. A liquid fluorocarbon coating composition as set forth in claim 2 wherein said acrylic resin comprises (1) in an amount of about 80 to about 95 percent, (2) in an amount of about 0.5 to about 15, and (3) in an amount of about 0.1 to about 30 percent, each based on the total weight of said acrylic resin.

4. A liquid fluorocarbon coating composition as set forth in claim 3 wherein said amino compound in the acrylic resin is present in an amount of from about 0.1 to about 15 percent based on the total weight of said acrylic resin.

5. A liquid fluorocarbon coating composition as set forth in claim 2 wherein (3) is selected from the group consisting of hydroxy ethyl methacrylate, hydroxy propyl methacrylate, hydroxypropyl acrylate, acetoacetoxyethyl methacrylate, and hydroxy ethyl acrylate.

6. A liquid fluorocarbon coating composition as set forth in claim 1 wherein (1) is selected from the group consisting of methyl methacrylate, ethyl acrylate, ethyl methacrylate, methyl acrylate, butyl acrylate, butyl methacrylate, and tert-butyl methacrylate.

7. A liquid fluorocarbon coating composition as set forth in claim 1 wherein (2) is selected from the group consisting of glycidyl methacrylate, glycidyl acrylate, glycidyl vinyl ether, and glycidyl vinylbenzyl ether.

8. A liquid fluorocarbon coating composition as set forth in claim 1 wherein said amino compound is selected from the group consisting of ethyleneurea, pyrrolidine, 2-pyrrolidone, piperidine, morpholine, t-butyl amine, isopropylamine, diisopropylamine, 2-amino-2-methyl-1-propanol, ethanol amine, dicyclohexyl amine, N,N-dimethyl-1,3-propanediamine, dimethyl amine, and diethanol amine.

9. A liquid fluorocarbon coating composition as set forth in claim 1 further comprising pigments dispersed in said fluorocarbon resin.

10. A liquid fluorocarbon coating composition as set forth in claim 1 having a solids content of from about 30 to about 70 percent.

11. A liquid fluorocarbon coating composition as set forth in claim 1 wherein said fluorocarbon resin is present in an amount of from about 30 to about 99 percent based on the total weight of the fluorocarbon coating composition.

12. A liquid fluorocarbon coating composition as set forth in claim 1 wherein said acrylic resin is present in an amount of from about 10 to about 60 percent based on the total weight of the fluorocarbon coating composition.

13. A liquid fluorocarbon coating composition as set forth in claim 1 wherein said cross-linking agent is present in an amount of from about 0.2 to about 10 percent based on the total weight of the fluorocarbon coating composition.

14. A liquid fluorocarbon coating composition as set forth in claim 1 wherein the solvent comprises an organic solvent.

15. An acrylic resin for use in a liquid fluorocarbon coating compositions, said acrylic resin solubilized in a solvent comprising a reaction product of at least one amino compound having a cyclic, heterocyclic, alkyl, or heteroalkyl structure substituted with a primary or secondary amine group and the reaction product of (1) at least one non-functional acrylic monomer and (2) at least one epoxy functional acrylic monomer having an epoxy group; and wherein said acrylic resin has amine functionality and hydroxyl functionality.

16. An acrylic resin as set forth in claim 15 wherein said acrylic resin further comprises the reaction product of (3) at least one functional acrylic monomer different than (2).

17. An acrylic resin as set forth in claim 16 wherein (3) is selected from the group consisting of hydroxy ethyl methacrylate, hydroxy propyl methacrylate, hydroxypropyl acrylate, acetoacetoxyethyl methacrylate, and hydroxy ethyl acrylate.

18. An acrylic resin as set forth in claim 15 wherein (1) is selected from the group consisting of methyl methacrylate, ethyl acrylate, ethyl methacrylate, methyl acrylate, butyl acrylate, butyl methacrylate, and tert-butyl methacrylate.

19. An acrylic resin as set forth in claim 15 wherein (2) is selected from the group consisting of glycidyl methacrylate, glycidyl acrylate, glycidyl vinyl ether, and glycidyl vinylbenzyl ether.

20. An acrylic resin as set forth in claim 15 wherein said amino compound is selected from the group consisting of ethyleneurea, pyrrolidine, 2-pyrrolidone, piperidine, morpholine, t-butyl amine, isopropylamine, diisopropylamine, 2-amino-2-methyl-1-propanol, ethanol amine, dicyclohexyl amine, N,N-dimethyl-1,3- propanediamine, dimethyl amine, and diethanol amine.

21. An acrylic resin as set forth in claim 16 wherein said acrylic resin comprises (1) in an amount of about 80 to about 96 percent, (2) in an amount of about 0.5 to about 15, and (3) in an amount of about 0.1 to about 20 percent, each based on the total weight of said acrylic resin.

22. An acrylic resin as set forth in claim 21 wherein said amino compound in said acrylic resin is present in an amount of from about 0.1 to about 15 percent based on the total weight of said acrylic resin.

* * * * *